(12) United States Patent
Liu

(10) Patent No.: US 11,790,657 B2
(45) Date of Patent: Oct. 17, 2023

(54) OBJECT COUNTING METHOD AND SURVEILLANCE CAMERA

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 17/536,127

(22) Filed: Nov. 29, 2021

(65) Prior Publication Data

US 2022/0180641 A1 Jun. 9, 2022

(30) Foreign Application Priority Data

Dec. 7, 2020 (TW) .................................. 109143047

(51) Int. Cl.
*G06V 20/52* (2022.01)
*G06T 7/66* (2017.01)
(Continued)

(52) U.S. Cl.
CPC .............. *G06V 20/52* (2022.01); *G06F 18/22* (2023.01); *G06T 7/215* (2017.01); *G06T 7/50* (2017.01); *G06T 7/66* (2017.01); *G06T 7/70* (2017.01); *H04N 7/183* (2013.01); *H04N 7/188* (2013.01); *G06T 2207/30196* (2013.01);
(Continued)

(58) Field of Classification Search
CPC ........ G06K 9/6215; G06T 2207/30196; G06T 2207/30232; G06T 2207/30242; G06T 7/215; G06T 7/50; G06T 7/66; G06T 7/70; G06T 2207/30241; G06T 7/246; G06V 20/52; G06V 2201/07; H04N 7/183; H04N 7/188; G06F 18/22
See application file for complete search history.

(56) References Cited

U.S. PATENT DOCUMENTS

| 5,926,518 A * | 7/1999 | Asokawa .................. G07C 9/00 377/6 |
| 2019/0057518 A1 * | 2/2019 | Liu .......................... G06V 20/53 |

FOREIGN PATENT DOCUMENTS

| DE | 10 2009 051 100 A1 | 5/2010 |
| DE | 102009051100 A1 * | 5/2010 ............... G06T 7/20 |

(Continued)

OTHER PUBLICATIONS

Dot product as projection onto a unit vector—Math Insight, https://mathinsight.org/dot_product, accessed Oct. 18, 2022 (Year: 2022).*

*Primary Examiner* — William C Vaughn, Jr.
*Assistant Examiner* — Naod W Belai
(74) *Attorney, Agent, or Firm* — Winston Hsu

(57) ABSTRACT

An object counting method is applied to a surveillance camera and used to determine an amount and a direction an object passing over a surveillance region. The object counting method includes acquiring a plurality of known traces, dividing the plurality of known traces into a first group passing the surveillance region along a first direction and a second group passing the surveillance region along a second direction, computing a first start point computed value of the first group and a second start point computed value of the second group to acquire a start point connection vector, and comparing the start point connection vector with a trace vector of a target object to determine whether the target object passes over the surveillance region along the first direction or the second direction.

18 Claims, 7 Drawing Sheets

(51) Int. Cl.
*G06T 7/50* (2017.01)
*G06T 7/70* (2017.01)
*G06T 7/215* (2017.01)
*H04N 7/18* (2006.01)
*G06F 18/22* (2023.01)

(52) U.S. Cl.
CPC ............... *G06T 2207/30232* (2013.01); *G06T 2207/30242* (2013.01); *G06V 2201/07* (2022.01)

(56) References Cited

FOREIGN PATENT DOCUMENTS

| | | |
|---|---|---|
| TW | 201129932 A1 | 9/2011 |
| TW | I511058 B | 12/2015 |
| TW | I611374 B | 1/2018 |
| TW | 616849 B1 * | 3/2018 |
| TW | I616849 B | 3/2018 |
| TW | I633501 B | 8/2018 |

* cited by examiner

OBJECT COUNTING METHOD AND SURVEILLANCE CAMERA

BACKGROUND OF THE INVENTION

1. Field of the Invention

The present invention relates to an object counting method and a related surveillance camera, and more particularly, to an object counting method capable of reducing manual control process for automatically accurate analysis and a related surveillance camera.

2. Description of the Prior Art

Traffic analysis technique is used to count a number of the customer in the shop or a number of the vehicle in the road. The customer passes over a specific door is defined as one counting datum. For determining whether a target object passes over the specific door, the conventional traffic analysis technique draws a flow channel corresponding to the specific door within the image, and any target object passes over the specific door can increase the counting number. However, the conventional traffic analysis technique draws the flow channel in accordance with a shape and a size of the specific door. If the surveillance camera is transferred from one type of bus to another type of bus, the flow channel is redesigned due to the specific type of the applicable bus; even if the surveillance camera is transferred to the same type of another bus, a front door and a rear door of the bus provide different regional features, and the flow channel is redesigned in response to the installation position being on the front door or the rear door. Thus, design of an object counting method capable of automatically detecting and identifying an entering trace and a leaving trace relevant to the surveillance region is an important issue in the surveillance camera industry.

SUMMARY OF THE INVENTION

The present invention provides an object counting method capable of reducing manual control process for automatically accurate analysis and a related surveillance camera for solving above drawbacks.

According to the claimed invention, an object counting method is used to determine a number and a direction a target object passing over a surveillance region. The object counting method includes acquiring a plurality of known traces, dividing the plurality of known traces into a first group passing the surveillance region along a first direction and a second group passing the surveillance region along a second direction, computing a first start point computed value of the first group and a second start point computed value of the second group to acquire a start point connection vector, and comparing the start point connection vector with a trace vector of the target object to determine whether the target object passes over the surveillance region along the first direction or the second direction.

According to the claimed invention, a surveillance camera includes an image receiver and an operation processor. The image receiver is adapted to receive a plurality of surveillance images relevant to a surveillance region. The operation processor is electrically connected to the image receiver in a wire manner or in a wireless manner. The operation processor is adapted to acquire a plurality of known traces, divide the plurality of known traces into a first group passing the surveillance region along a first direction and a second group passing the surveillance region along a second direction, compute a first start point computed value of the first group and a second start point computed value of the second group to acquire a start point connection vector, and compare the start point connection vector with a trace vector of a target object to determine whether the target object passes over the surveillance region along the first direction or the second direction.

The object counting method and the surveillance camera of the present invention do not require adjusting configuration parameters of the surveillance camera by referring to environmental variation. Only if the surveillance region of the surveillance camera contains a sight inside and outside the bus door, the object counting method of the present invention can rapidly find out the reference for determining whether the target object moves in and out the bus door and a moving direction of the target object in accordance with the gathered known traces, without manually defining a shape and a size of the bus door, so as to effectively increase an execution speed and detection accuracy of the object counting result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
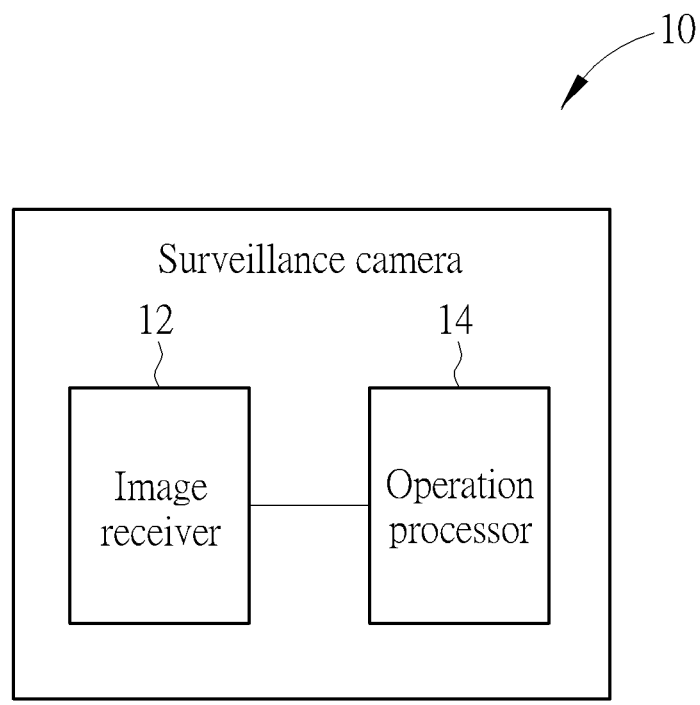
FIG. 1 is a functional block diagram of a surveillance camera according to an embodiment of the present invention.

Please refer to FIG. 1. FIG. 1 is a functional block diagram of a surveillance camera 10 according to an embodiment of the present invention. The surveillance camera 10 can be installed on a variety of environments, such as an inlet of a shop, a train or a bus, and used to count a number of a target object, which means human, without setting or adjusting specific parameter of the surveillance camera 10 based on the environment. The surveillance camera 10 can be a two dimensional camera used to compute a geometrical center of a human pattern within a surveillance image to be a trace point. The geometrical center may be a mass center or a gravity center of the human pattern. The surveillance camera 10 can further be a three dimensional camera used to acquire depth information of the target object from the surveillance image, and estimate a foot position from a head of the target object to be the trace point. Application of the surveillance camera 10 is not limited to the above-mentioned embodiments, and depends on a design demand.

For example, the bus may have several types, and each type of the bus can have a door size, an aisle width and a ceiling height different from ones of other types of the bus; further, an inclined angle of the surveillance camera 10 installed on the bus may not accurately conform to a predefined angle because of manual error. In the present invention, when the surveillance camera 10 is installed on the ceiling of the bus for analyzing and counting the target object (which means passengers) walking in and out of the bus door, there is no need of manually setting and adjusting parameters of the surveillance camera 10 in accordance with variable factors of the environment, so that the surveillance camera 10 can effectively reduce manual adjustment loading and increase counting accuracy. The surveillance camera 10 can include an image receiver 12 and an operation processor 14. The image receiver 12 can acquire a plurality of surveillance images relevant to a surveillance region of the surveillance camera 10. The operation processor 14 can be electrically connected to the image receiver 12 in a wire manner or in a wireless manner, and used to analyze the surveillance images for determining a number and a direction of the target object passing over the surveillance region.

Figure 2:
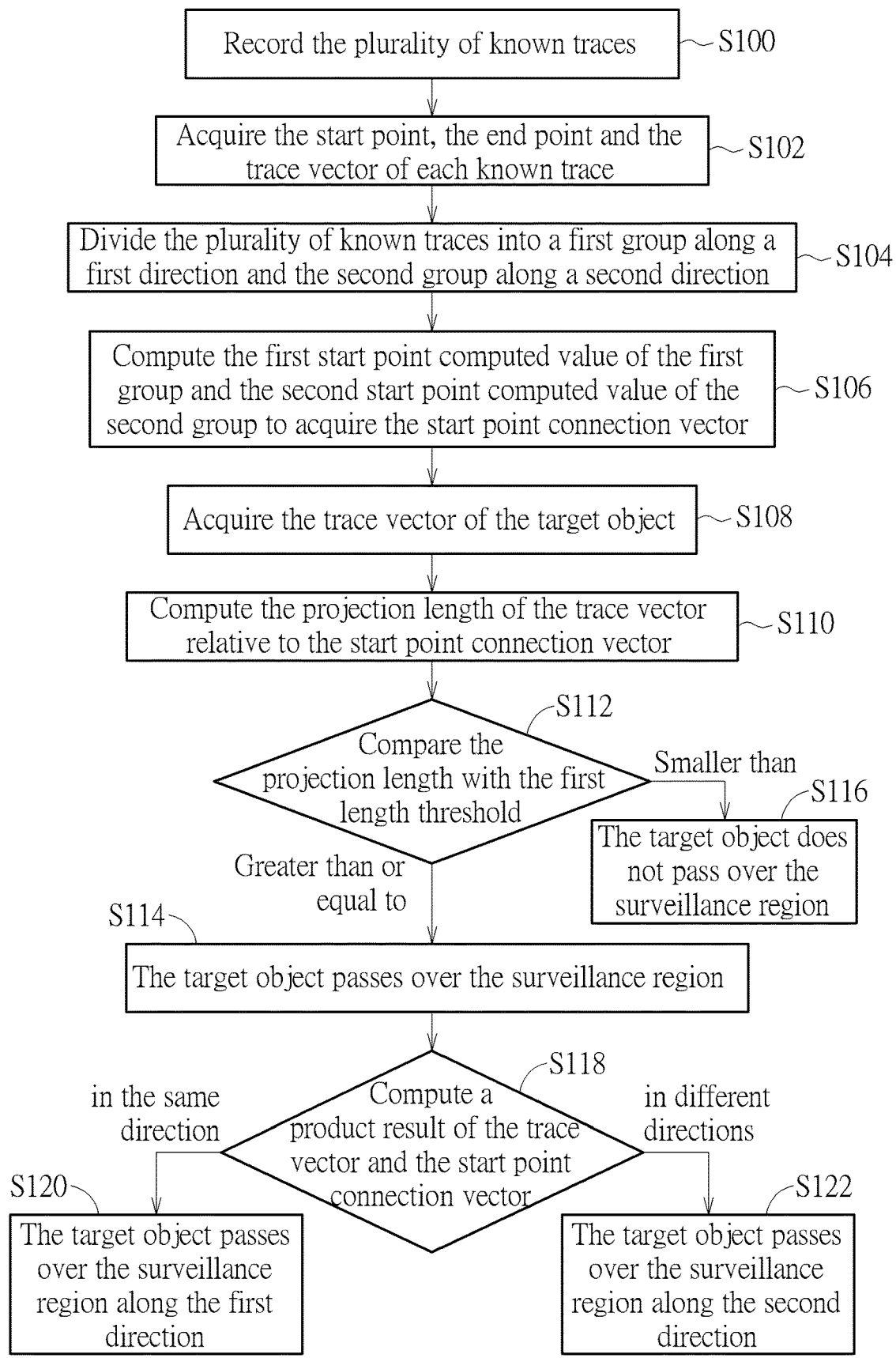
FIG. 2 is a flow chart of an object counting method according to the embodiment of the present invention.
Figure 3:
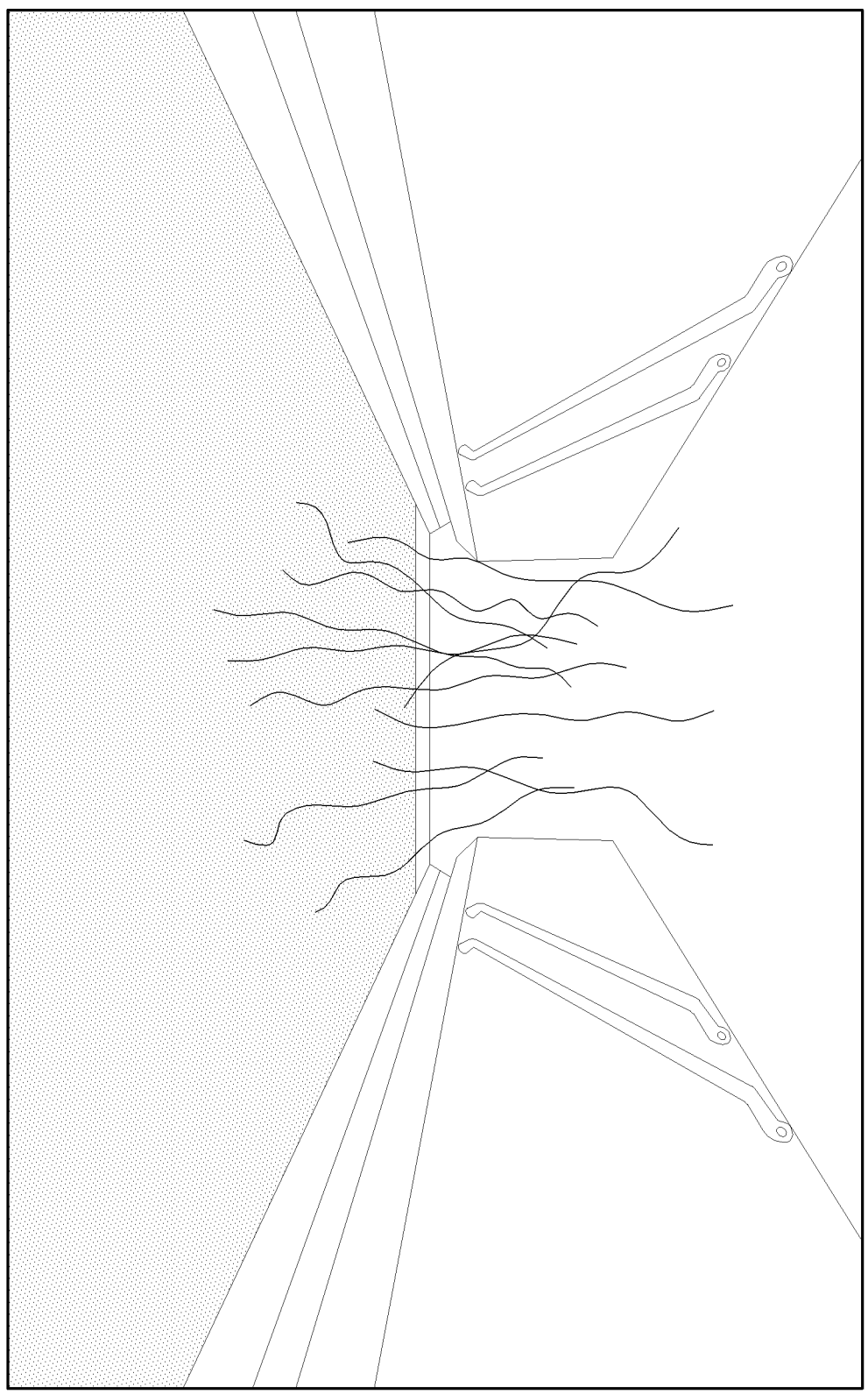
FIG. 3 to FIG. 6 are diagrams of the surveillance image acquired by the surveillance camera according to the embodiment of the present invention.
Figure 4:
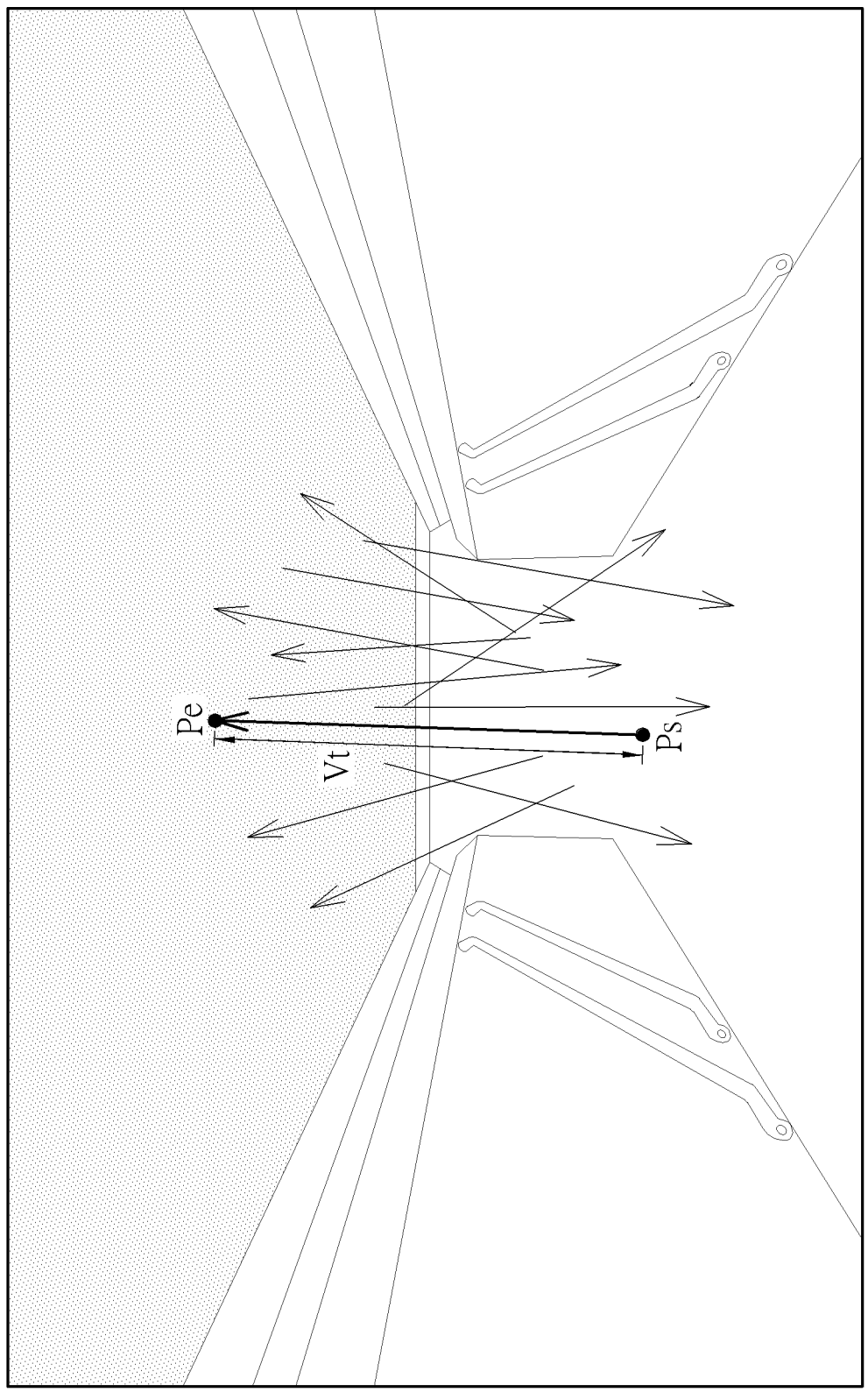

Please refer to FIG. 2 to FIG. 6. FIG. 2 is a flow chart of an object counting method according to the embodiment of the present invention. FIG. 3 to FIG. 6 are diagrams of the surveillance image acquired by the surveillance camera 10 according to the embodiment of the present invention. The object counting method illustrated in FIG. 2 can be suitable for the surveillance camera 10 shown in FIG. 1. First, step S100 can be executed that the object counting method records a plurality of known traces of all target objects that pass over a region within the surveillance image in a predefined period. If the surveillance camera 10 is disposed on the ceiling above the bus door, the surveillance camera 10 can face the bus door to capture the surveillance image shown in FIG. 3 to FIG. 6. The surveillance region can be defined as an in and out region between two opposite doors of the bus. The target object may be a passenger getting on or getting off the bus through the bus door. A moving path of the passenger getting on or getting off the bus may be an irregular curve due to a queued situation or a crowded situation, and the irregular curves shown in FIG. 3 can be defined as the known traces in step S100.

It should be mentioned that step S100 can gather a series of surveillance images, and individually analyze coordinate variation of all the target objects within each of the series of surveillance images to acquire the known traces. The plurality of known traces of all the target objects cannot be acquired by one surveillance image, and may be gathered from several surveillance images and accumulated in the same surveillance image, such as FIG. 3, for simplicity.

The present invention can determine the number and the direction of the target object in accordance with a trend of each known trace, and does not compute accurate coordinates of the known trace at every point of time, so as to effectively decrease computation quantity and increase determination efficiency. Then, step S102 can be executed to acquire a start point Ps and an end point Pe of each known trace, and set a trace vector Vt from the start point Ps to the end point Pe of each known trace. Each known trace has the start point, the end point and the trace vector; however, the start point Ps, the end point Pe and the trace vector Vt are only marked on one known trace in FIG. 4 for simplicity, and other trace vectors are drawn by an arrow without being symbolized.

Figure 5:
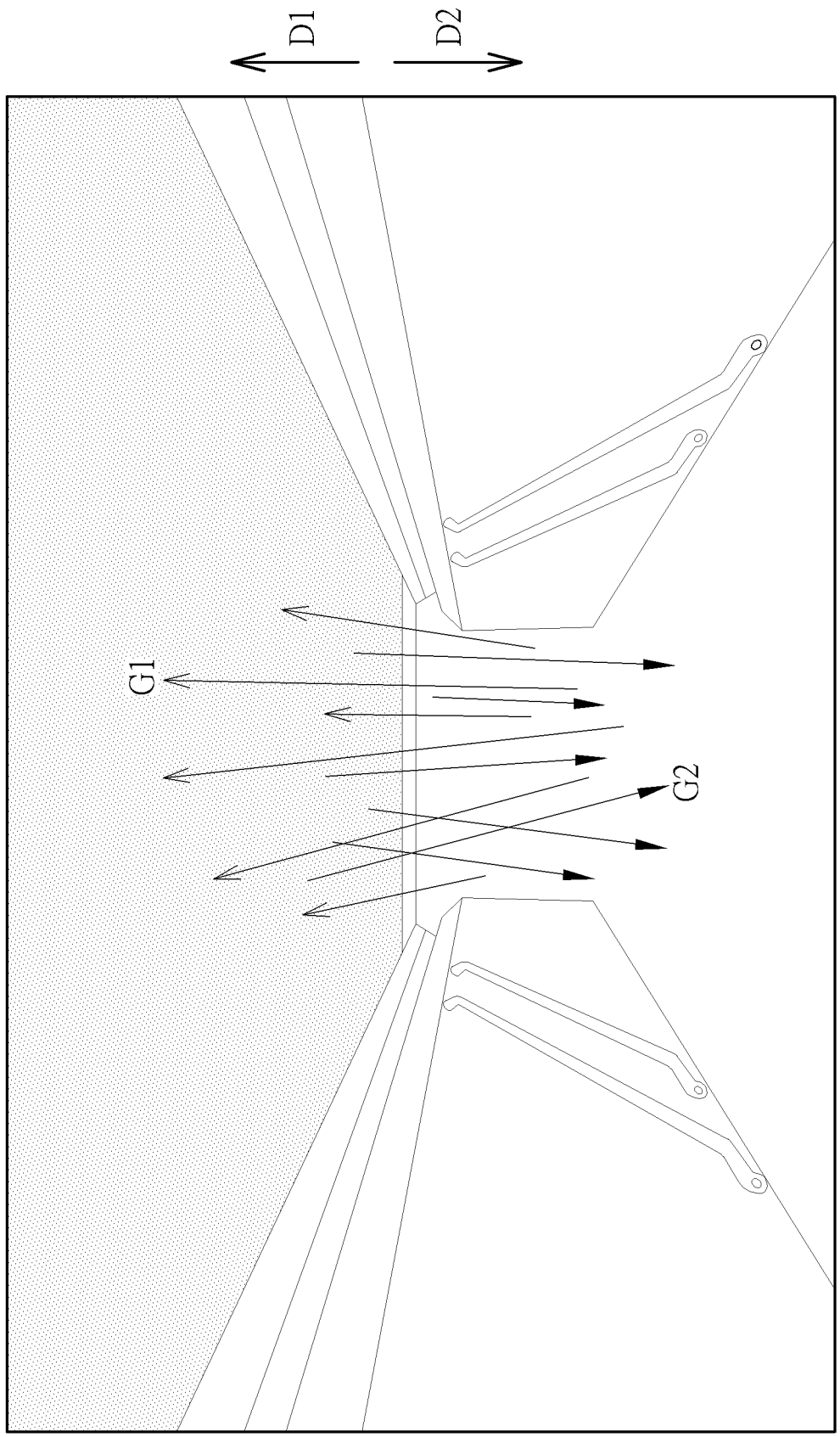
Figure 6:
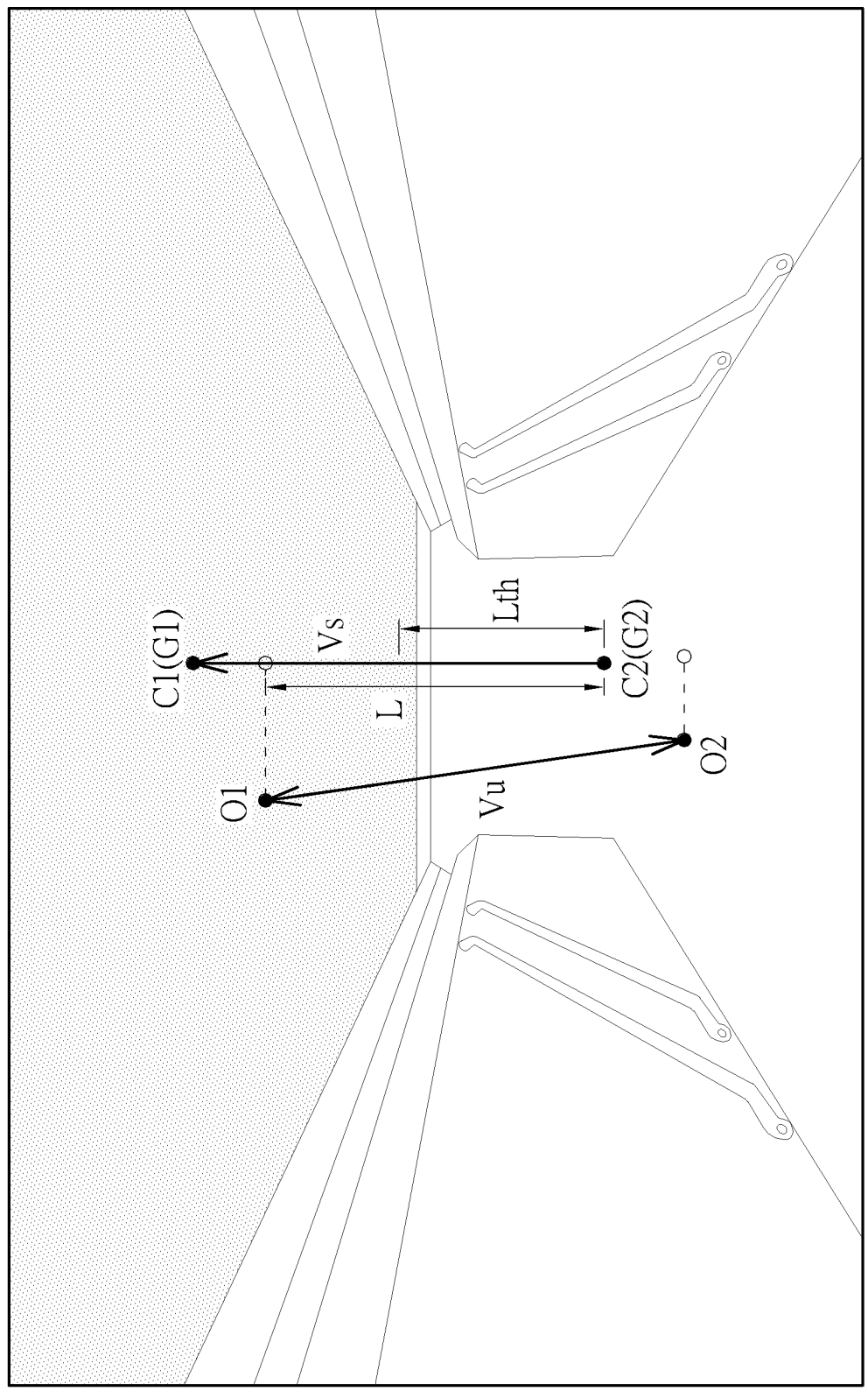

Then, step S104 can be executed to divide the plurality of known traces (or the related trace vectors Vt) into a first group G1 passing the surveillance region along a first direction D1 and a second group G2 passing the surveillance region along a second direction D2 via cluster analysis or other classifying technique, as shown in FIG. 5. The first group G1 is a cluster of the trace vectors leaving the bus door, and the second group G2 is another cluster of the trace vectors entering the bus door. The first direction D1 may be or not be opposite to the second direction D2. Any directions capable of indicating orientation of leaving and entering the bus door can belong to a scope of the first direction D1 and the second direction D2 of the present invention. Then, step S106 can be executed to compute a first start point computed value C1 of the first group G1 and a second start point computed value C2 of the second group G2 for acquiring a start point connection vector Vs, which means the start points of all the trace vectors in the first group G1 are applied for the first start point computed value C1, and the start points of all the trace vectors in the second group G2 are applied for the second start point computed value C2. The first start point computed value C1 may be a mean value or a gravity center of all the start points within the first group G1, and the second start point computed value C2 may be the mean value or the gravity center of all the start points within the second group G2, as shown in FIG. 6.

Steps S100 to S106 can be used to establish a database, and to determine a dimension and orientation of the surveillance region via data statistics. Then, if the surveillance camera 10 detects the target object passes over the surveillance region, steps S108, S110 and S112 can be executed to acquire a leaving point O1 and a stopping point O2 and a trace vector Vu of the moving trace of the target object, compute a projection length L of the trace vector Vu relative to the start point connection vector Vs, and compare the projection length L with a predefined first length threshold Lth. The leaving point O1 and the stopping point O2 in step S108 can respectively be coordinates information of a beginning end and a rear end of the irregular moving trace, and the trace vector Vu can be connected between the leaving point O1 and the stopping point O2. The projection length L in step S100 can be a length of an overlapped line of the trace vector Vu projected onto a connection line between the first start point computed value C1 and the second start point computed value C2. The connection line may be represented as the start point connection vector Vs. The first length threshold Lth in step S112 can be a computed result of the weighted start point connection vector Vs, and a weighting value can correspond to a user experience, a regional feature of the surveillance region, accuracy needed in the counting, or other possible factors, and a detailed description of the weighting value is omitted herein for simplicity. The first length threshold Lth shown in FIG. 6 can be set as a half of the length of the start point connection vector Vs, which depends on the design demand.

If the surveillance camera 10 is the 3D camera, the object counting method in step S108 can search a top (such as the head) of the target object within each surveillance image via image analysis technique, and estimate a bottom (such as the foot) of the target object in accordance with depth information of the target object, and define the leaving point O1 and the stopping point O2 from the coordinates information of the bottom of the target object within the surveillance image at different points of time, so as to acquire the trace vector Vu; further, the surveillance camera 10 may define the leaving point O1 and the stopping point O2 from the coordinates information of the top of the target object within the surveillance image at different points of time. Definition of the leaving point O1 and the stopping point O2 can depend on the design demand and a detailed description is omitted herein for simplicity.

If the projection length L is greater than or equal to the first length threshold Lth, the target object has a sufficient moving distance, and step S114 can be executed to determine that the trace vector Vu of the target object actually passes over the surveillance region. If the projection length L is smaller than the first length threshold Lth, the target object does not have the sufficient moving distance, and step S116 can be executed to determine that the trace vector Vu of the target object does not pass over the surveillance region. Even though the target object is confirmed as passing over the surveillance region, the target object may enter or leave the surveillance region, so that step S118 can be executed to compute a product result of the trace vector Vu and the start point connection vector Vs to analyze a directional feature of the trace vector Vu and the start point connection vector Vs. If the product result is greater than or equal to zero, the trace vector Vu and the start point connection vector Vs are in the same direction, and step S120 can be executed to determine that the target object passes over the surveillance region along the first direction D1. If the product result is smaller than zero, the trace vector Vu and the start point connection vector Vs are in different directions, and step S122 can be executed to determine that the target object passes over the surveillance region along the second direction D2.

It should be mentioned that the object counting method of the present invention can optionally utilize an end point connection vector between the first group G1 and the second group G2 to determine whether the target object passes over the surveillance region along the first direction D1 or the second direction D2; however, the passenger may walk to a front or a rear of the aisle when getting on the bus, and may walk to any possible directions when getting off the bus, so that a first end point computed value and a second end point computed value of the end point connection vector may be adjusted to accurately represent a trace ended region of entering and leaving the surveillance region. Besides, the passengers may congregate outside the door when getting on the bus, and congregate inside the door when getting off the bus, so that the object counting method can preferably utilize the start point connection vector Vs of the first group G1 and the second group G2 to be a reference for determining whether the target object passes over the surveillance region along the first direction D1 or the second direction D2. Application of setting the reference is not limited to the above-mentioned embodiment, and depends on an actual demand.

Figure 7:
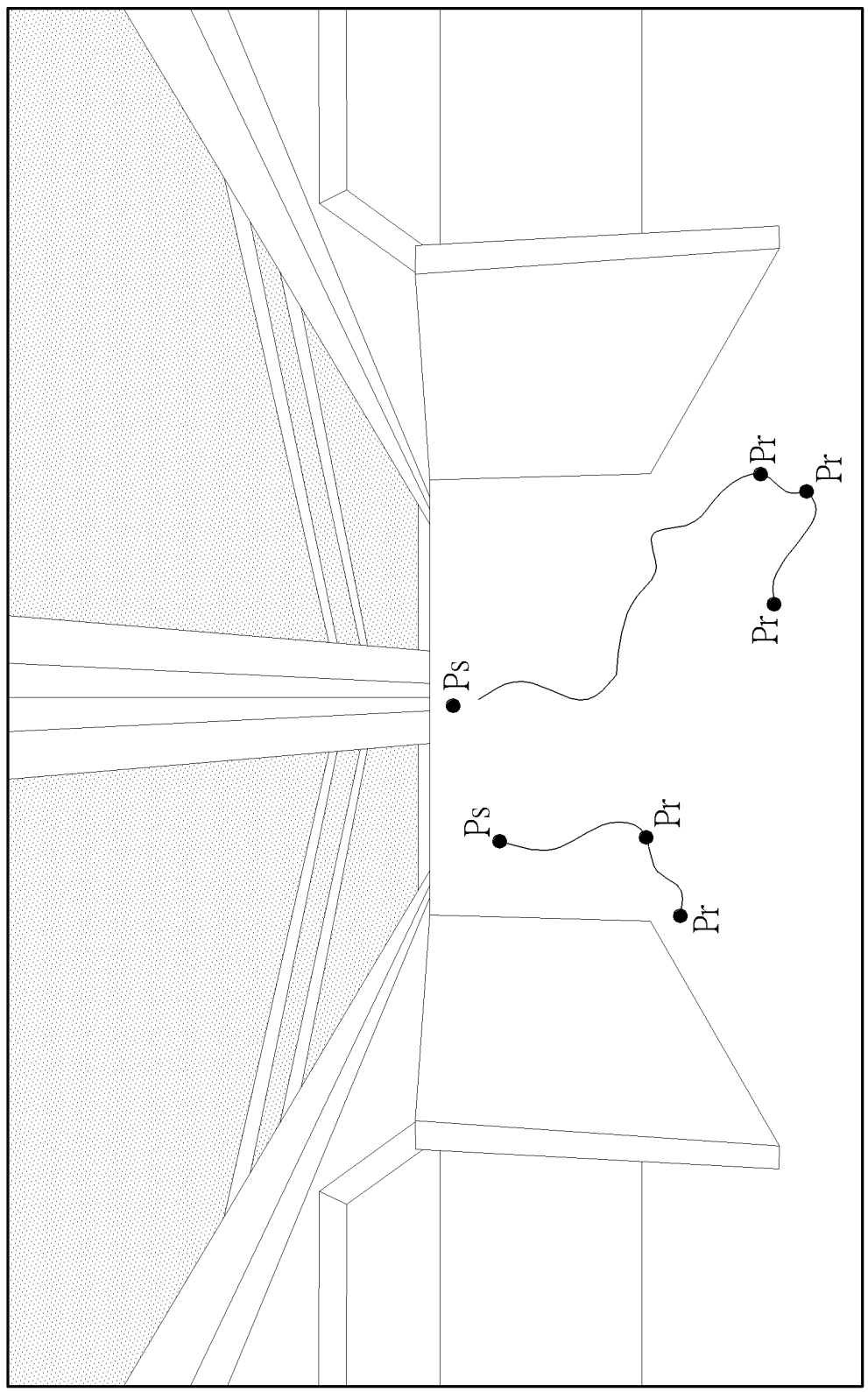
FIG. 7 is a diagram of the surveillance image acquired by the surveillance camera in a specific condition according to the embodiment of the present invention.

Foresaid description illustrates how to determine the number and the direction of the passenger getting on and getting off the bus when the bus is not full. Please refer to FIG. 7. FIG. 7 is a diagram of the surveillance image acquired by the surveillance camera 10 in a specific condition according to the embodiment of the present invention. If the bus is almost full and the door is switched from an open mode to a close mode, some passengers may stay or wander inside the surveillance region and cannot leave the surveillance region to walk into the aisle. The known traces of the passenger can be shown in FIG. 7; before the specific condition (such as the door being closed) happened, the start point Ps may be nearby the bus door, and the trace wandered inside the surveillance region may have several relay points Pr. In the meantime, the moving distance of some passenger is short, and determination based on the first length threshold Lth may result counting error. Therefore, the object counting method of the present invention can automatically trigger the operation processor 14 to transform the first length threshold Lth into a second length threshold in accordance with the specific condition. The second length threshold is shorter than the first length threshold Lth, and can be used to determine the number and the direction of the target object getting on the bus and staying or wandering around the bus door.

In step S108, the object counting method can further detect a condition of the surveillance region. If the surveillance region is not in the specific condition, the bus door is open, and steps S108 to S122 can be executed as above-mentioned process for determination. If the surveillance region is in the specific condition, the bus door is closed, and the object counting method can optionally transform the first length threshold Lth into the second length threshold (which is not shown in the figures), and search the start point (which may be an initial coordinates of the passenger just entering the surveillance region from outside) of the target object before the specific condition happened, and further search one or several relay points (because the passenger may move in a short distance inside the bus) of the target object after the specific condition happened, and then compute a plurality of candidate trace vectors between the start point and the relay points.

Generally, a longest candidate trace vector of the plurality of candidate trace vectors can represent that the passenger goes deep into the bus to be far from the bus door for safety, so that the object counting method can set the longest candidate trace vector as the trace vector Vu of the target object, and compare the projection length L of the trace vector Vu relative to the start point connection vector Vs with the second length threshold, and then execute step S114 to S122 to determine whether the target object passes over the surveillance region. That is to say, the present invention can determine the number of the passenger entering and leaving the bus via the first length threshold Lth when the bus door is open, and further determine the number of the passenger entering the bus via the shortened second length threshold, so as to ensure the target object stayed around the bus door can be accurately counted.

In conclusion, the object counting method and the surveillance camera of the present invention do not require adjusting configuration parameters of the surveillance camera by referring to environmental variation. Only if the surveillance region of the surveillance camera contains a sight inside and outside the bus door, the object counting method of the present invention can rapidly find out the reference for determining whether the target object moves in and out the bus door and a moving direction of the target object in accordance with the gathered known traces, without manually defining a shape and a size of the bus door, so as to effectively increase an execution speed and detection accuracy of the object counting result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object counting method of determining a number and a direction a target object passing over a surveillance region, the object counting method comprising:
   acquiring a plurality of known traces;
   dividing the plurality of known traces into a first group passing the surveillance region along a first direction and a second group passing the surveillance region along a second direction;

acquire a start point connection vector by computing difference between a first start point computed value of the first group and a second start point computed value of the second group; and comparing the start point connection vector with a trace vector of the target object to determine whether the target object passes over the surveillance region along the first direction or the second direction;

wherein each of the plurality of known traces has a start point and an end point, several start points of several known traces in the first group are analyzed to acquire the first start point computed value, and several start points of several known traces in the second group are analyzed to acquire the second start point computed value.

2. The object counting method of claim 1, wherein comparing the start point connection vector with the trace vector of the target object to determine whether the target object passes over the surveillance region along the first direction or the second direction comprises:

computing a projection length of the trace vector relative to the start point connection vector; and comparing the projection length with a first length threshold to determine whether the target object passes over the surveillance region.

3. The object counting method of claim 2, wherein the projection length is a length of a line of the trace vector projected onto a connection line between the first start point computed value and the second start point computed value.

4. The object counting method of claim 2, wherein the trace vector passes over the surveillance region in response to the projection length greater than or equal to the first length threshold, and the trace vector does not pass over the surveillance region in response to the projection length smaller than the first length threshold.

5. The object counting method of claim 1, wherein comparing the start point connection vector with the trace vector of the target object to determine whether the target object passes over the surveillance region along the first direction or the second direction comprises:

computing a product result of the trace vector and the start point connection vector; and analyzing the product result to determine whether the target object passes over the surveillance region along the first direction or the second direction.

6. The object counting method of claim 5, wherein the trace vector passes over the surveillance region along the first direction in response to the trace vector and the start point connection vector being in the same direction, and the trace vector passes over the surveillance region along the second direction in response to the trace vector and the start point connection vector being in different directions.

7. The object counting method of claim 2, further comprising:

detecting whether the surveillance region is in a specific condition;

transforming the first length threshold into a second length threshold when the surveillance region is in the specific condition;

searching a start point happened before the specific condition and a plurality of relay points of the target object;

computing a plurality of candidate trace vectors respectively between the start point and the plurality of relay points;

setting one of the plurality of candidate trace vectors with a longest length as the trace vector; and comparing the projection length of the foresaid trace vector relative to the start point connection vector with the second length threshold to determine whether the target object passes over the surveillance region.

8. The object counting method of claim 1, wherein the first start point computed value is a mean value or a gravity center of a plurality of first start points within the first group.

9. The object counting method of claim 1, further comprising:

searching a top of the target object within a surveillance image via an image analysis technique;

estimating a bottom of the target object in accordance with depth information of the target object; and acquiring the trace vector of the target object via coordinates information of the bottom in different points of time.

10. A surveillance camera, comprising:

an image receiver adapted to receive a plurality of surveillance images relevant to a surveillance region; and an operation processor electrically connected to the image receiver in a wire manner or in a wireless manner, the operation processor being adapted to acquire a plurality of known traces, divide the plurality of known traces into a first group passing the surveillance region along a first direction and a second group passing the surveillance region along a second direction, acquire a start point connection vector by computing difference between a first start point computed value of the first group and a second start point computed value of the second group, and compare the start point connection vector with a trace vector of a target object to determine whether the target object passes over the surveillance region along the first direction or the second direction;

wherein each of the plurality of known traces has a start point and an end point, several start points of several known traces in the first group are analyzed to acquire the first start point computed value, and several start points of several known traces in the second group are analyzed to acquire the second start point computed value.

11. The surveillance camera of claim 10, wherein the operation processor is further adapted to compute a projection length of the trace vector relative to the start point connection vector, and compare the projection length with a first length threshold to determine whether the target object passes over the surveillance region.

12. The surveillance camera of claim 11, wherein the projection length is a length of a line of the trace vector projected onto a connection line between the first start point computed value and the second start point computed value.

13. The surveillance camera of claim 11, wherein the trace vector passes over the surveillance region in response to the projection length greater than or equal to the first length threshold, and the trace vector does not pass over the surveillance region in response to the projection length smaller than the first length threshold.

14. The surveillance camera of claim 10, wherein the operation processor is further adapted to compute a product result of the trace vector and the start point connection vector, and analyze the product result to determine whether the target object passes over the surveillance region along the first direction or the second direction.

15. The surveillance camera of claim 14, wherein the trace vector passes over the surveillance region along the first direction in response to the trace vector and the start point connection vector being in the same direction, and the trace vector passes over the surveillance region along the second direction in response to the trace vector and the start point connection vector being in different directions.

16. The surveillance camera of claim 11, wherein the operation processor is further adapted to detect whether the surveillance region is in a specific condition, transform the first length threshold into a second length threshold when the surveillance region is in the specific condition, search a start point happened before the specific condition and a plurality of relay points of the target object, compute a plurality of candidate trace vectors respectively between the start point and the plurality of relay points, set one of the plurality of candidate trace vectors with a longest length as the trace vector, and compare the projection length of the foresaid trace vector relative to the start point connection vector with the second length threshold to determine whether the target object passes over the surveillance region.

17. The surveillance camera of claim 10, wherein the first start point computed value is a mean value or a gravity center of a plurality of first start points within the first group.

18. The surveillance camera of claim 10, wherein the operation processor is further adapted to search a top of the target object within a surveillance image via an image analysis technique, estimate a bottom of the target object in accordance with depth information of the target object, and acquire the trace vector of the target object via coordinates information of the bottom in different points of time.

* * * * *